United States Patent
Ludwig et al.

(10) Patent No.: US 8,240,750 B2
(45) Date of Patent: Aug. 14, 2012

(54) AIR DUCT SYSTEM MATING ROOF AIR DUCTS WITH HEADLINER AIR DUCTS

(75) Inventors: Adam Michael Ludwig, Ann Arbor, MI (US); Jeff Charles Hills, Grand Rapids, MI (US); Donald Federico, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 394 days.

(21) Appl. No.: 12/628,694

(22) Filed: Dec. 1, 2009

(65) Prior Publication Data

US 2011/0127803 A1    Jun. 2, 2011

(51) Int. Cl.
*B60H 1/24*    (2006.01)
*B60J 7/00*    (2006.01)

(52) U.S. Cl. ........................ 296/208; 296/214
(58) Field of Classification Search .............. 296/208, 296/214
See application file for complete search history.

(56) References Cited

U.S. PATENT DOCUMENTS

| | | | |
|---|---|---|---|
| 5,913,566 A * | 6/1999 | Stauffer et al. | 296/190.1 |
| 6,062,635 A | 5/2000 | Learman et al. | |
| 6,086,145 A * | 7/2000 | Wandyez | 296/214 |
| 6,309,012 B1 | 10/2001 | Fryk et al. | |
| 6,322,136 B2 | 11/2001 | Boyce et al. | |
| 6,409,947 B1 | 6/2002 | Wandyez | |
| 6,685,262 B1 | 2/2004 | Tiesler et al. | |
| 6,749,255 B2 | 6/2004 | Dykman et al. | |
| 6,889,381 B2 * | 5/2005 | Kikuchi et al. | 720/718 |
| 7,044,537 B2 | 5/2006 | Schoemann et al. | |
| 2005/0039474 A1 | 2/2005 | Bogart et al. | |
| 2005/0202774 A1 | 9/2005 | Lipke | |
| 2008/0061604 A1 | 3/2008 | Tiesler et al. | |

FOREIGN PATENT DOCUMENTS

| | | |
|---|---|---|
| JP | 2000220881 A | 8/2000 |
| JP | 2008044422 A | 2/2008 |

OTHER PUBLICATIONS

Copending U.S. Appl. No. 12/510,752, filed Jul. 28, 2009.

* cited by examiner

*Primary Examiner* — Lori Lyjak
(74) *Attorney, Agent, or Firm* — Gifford, Krass, Sprinkle, Anderson & Citkowski, P.C.

(57) ABSTRACT

An air duct system which mates an air duct attached to the roof of an automotive vehicle and an air duct attached to a nonexposed surface of a headliner is provided. The air duct system is attached to an air supply which delivers directed air and is disposed between an inner surface of the roof and the nonexposed surface of the headliner. The headliner includes an opening into the passenger compartment of the automotive vehicle. The air duct system includes a first air duct and a second air duct. The first air duct is attached to the inner surface of the roof, and the second air duct is attached to the nonexposed surface of the headliner. Upon installation of the headliner to the roof a portal on the first air duct registers with a portal on the second air duct so as to provide an air flow passage between said first air duct and said second air duct.

16 Claims, 3 Drawing Sheets

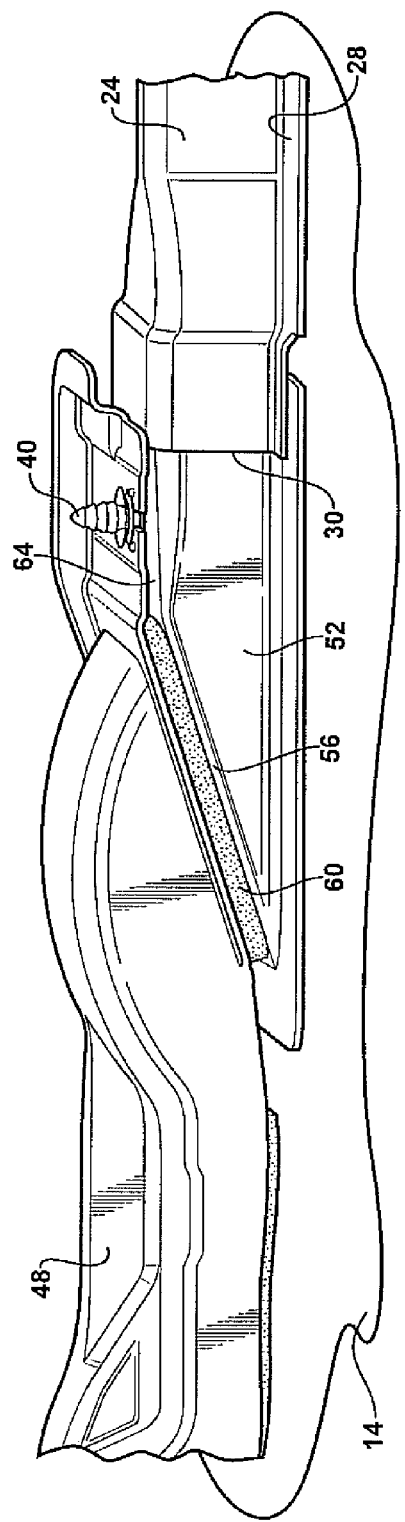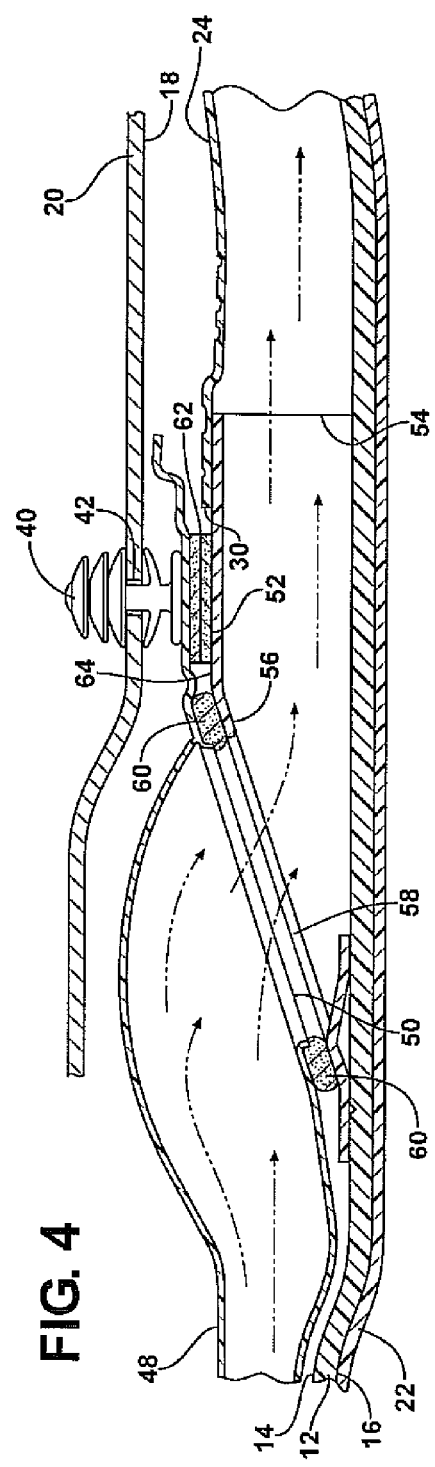

AIR DUCT SYSTEM MATING ROOF AIR DUCTS WITH HEADLINER AIR DUCTS

FIELD OF THE INVENTION

The invention relates to an air duct system for use in automotive vehicles. More particularly, the invention relates to an air duct system which mates an air duct attached to an inner surface of the roof with an air duct attached to a headliner.

BACKGROUND OF THE INVENTION

In order to provide adequate heating and cooling to occupants of a passenger compartment, modern automotive vehicles typically utilize an air duct system disposed above a headliner. The headliner is attached to the inner surface of the automotive vehicle roof to conceal the air duct system so as to provide an aesthetically pleasing appearance to the passenger compartment. Outlet registers are mounted in vent openings formed at various locations in the headliner to provide air flow to specific areas of the passenger compartment.

A previously known air duct system utilizes a number of air ducts which are attached to an inner surface of the automotive vehicle roof. The air ducts include a number of outlets which correspond to the vents located on the headliner. During assembly of the automotive vehicle, an assembly team member will install the blow molded air duct assembly to the inner surface of the automotive vehicle roof. Next the openings in the headliner are aligned with the outlets of the air duct system and then the headliner is attached to the roof of the automotive vehicle.

One drawback of attaching the air duct system to the roof is that each of the outlets must be precisely aligned with the vent openings formed in the headliner prior to attachment of the headliner. As such, installation of the air duct system and the headliner results in a decrease in production efficiency due to the required installation time. However, the air duct system is advantageous in that the positions of the various other components concealed by the headliner, illustratively including wiring harnesses and transport tubing, are unaffected by the air duct system, as it is spaced above the headliner.

Another previously known air duct system utilizes preinstalled air ducts attached to the headliner. The air ducts have a generally U-shaped cross section and are fixedly secured to the headliner assembly so as to define an air flow passage. The air duct system includes an inlet for receiving directed air from the HVAC system, and covers the openings formed in the headliner. Attaching the air ducts to the headliner provides a number of advantages such as an increase in production efficiency as the air ducts are preinstalled on the headliner prior to the attachment of the headliner to the roof of the automotive vehicle. Further, the air ducts provide additional structural rigidity to the headliner.

A drawback to the above described air duct system is that a continuous seal between the air duct and the headliner is required. If the seal is interrupted, air will leak from the air duct into the space between the headliner and the roof. The loss of air will decrease the air flowing into the passenger compartment, thereby, decreasing the efficiency of the overall HVAC system.

A particular problem involves the placement of fluid transport components, illustratively including wiper fluid hoses and water drain off hoses, between the headliner and the roof. The fluid transport components often have to cross an area of the headliner covered by the air duct. The wiper fluid hoses transport wiper fluid to a rear windshield wiper dispenser, while the water drain off hoses are used to drain off water entering the slide tracks of sunroofs which can be partially surrounded by the air ducts, particularly in headliners having sunroofs disposed towards the rear of the vehicle or those having secondary sunroofs.

As the fluid transport components contains a liquid, extending the transport components above and around the air duct requires that the fluid flow uphill. Further, it is unadvisable to extend the transport components between the air duct and the headliner due to the possibility of degrading the seal. In addition, if the transport components were to rupture within the air duct fluids would leak into the passenger compartment through the vent openings formed in headliner.

Thus, there exists a need for an improved air duct system which combines the advantages of the air duct system attached to the roof and the air duct system attached to the headliner.

SUMMARY OF THE INVENTION

The present invention provides an improved air duct assembly which overcomes the above-mentioned disadvantages of the previously known air duct systems.

In brief, an air duct system which mates an air duct attached to the roof of an automotive vehicle and an air duct attached to a nonexposed surface of a headliner is provided. The air duct system is attached to an air supply which delivers directed air from an HVAC system. The air duct system is disposed between an inner surface of the roof and the nonexposed surface of the headliner. The headliner includes a vent opening into the passenger compartment of the automotive vehicle. The air duct system includes a first air duct and a second air duct. The first air duct is attached to the inner surface of the roof, and the second air duct is attached to the nonexposed surface of the headliner.

Upon installation of the headliner to the roof a portal on the first air duct registers with a portal on the second air duct so as to provide an air flow passage between said first air duct and said second air duct. The first air duct includes one of an inlet connected to the air supply or an outlet connected to the opening and the second air duct includes the other of the inlet or the outlet. As such, the first air duct and the second air duct provide an air flow passage extending between the air supply and the opening into the passenger compartment.

In one embodiment, a connection member having a first end and an second end is disposed between the first air duct and the second air duct. The first end is affixed to one of the first air duct or the second air duct, and the second end is in abutting contact with the other of the first air duct or the second air duct upon installation of the headliner to the roof.

BRIEF DESCRIPTION OF THE DRAWINGS

A better understanding of the present invention will be had upon reference to the following detailed description when read in conjunction with the accompanying drawings, wherein like reference characters refer to like parts throughout the several views and in which:

FIG. 3 is a side perspective view illustrating the connection between the first duct and the second duct; and FIG. 4 is a partial cross-sectional view taken along the line 4-4 of FIG. 2.

DETAILED DESCRIPTION OF A PREFERRED EMBODIMENT OF THE INVENTION

The present invention has utility as an air duct system disposed between a headliner and an inner surface of the roof of the automotive vehicle which overcomes the above-mentioned disadvantages. The air duct system combines two different types of air ducts, those attached to the roof of the automotive vehicle and those attached to an upper surface of the headliner, to form a hybrid air duct system which includes the advantages of both types of air ducts. Further, the inventive air duct system is configured so that the components may be installed without a visual alignment by an assembly team member.

Figure 1:
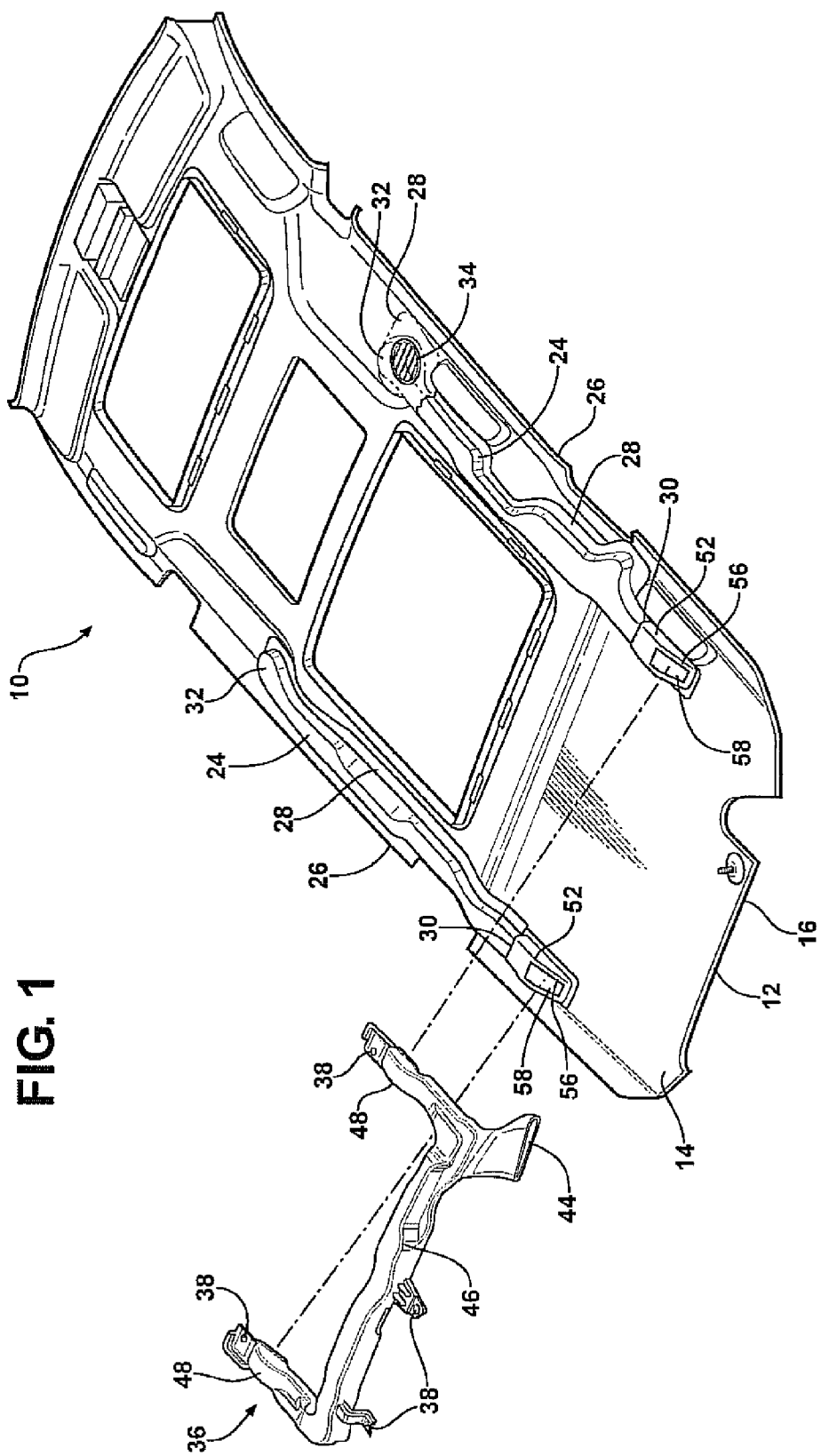
FIG. 1 is a front perspective view illustrating the inventive air duct system.

Referring to FIG. 1, a headliner assembly is generally indicated at 10. The headliner assembly 10 includes a headliner body 12 having a nonexposed upper surface 14 and an opposite exposed lower surface 16. As seen in FIG. 4, the nonexposed surface 14 faces an inner surface 18 of a roof 20 of the automotive vehicle, and the exposed surface 16 faces a passenger compartment of the automotive vehicle. Optionally, a headliner cover 22 is attached to the exposed surface 16 of the headliner body 12 to provide an aesthetically pleasing appearance to the passenger compartment.

Referring back to FIG. 1, an elongated headliner duct 24 is positioned on the nonexposed surface 14 on both lateral sides 26 of the headliner body 12. The headliner duct 24 has a generally U-shaped cross section having an open face. Flanges 28 extend from either side of the open face and are attached to the nonexposed surface 14 to form an air flow passage between the headliner duct 24 and the nonexposed surface 14 of the headliner body 12. The flanges 28 of the headliner duct 24 are attached to the nonexposed surface 14 by adhesive, welding, or other known techniques to secure one object to another.

The headliner duct 24 has a portal 30 at an open end, and an outlet 32 at an opposite end thereof. The outlet 32 is formed of an enlarged portion of the headliner duct 24 and is positioned above vent openings 34 having outlet registers are formed along the lateral sides 26 of the headliner body 12. Air entering the portal 30 flows through the air flow passage, formed by the headliner duct 24 and the nonexposed surface 14, and enters the passenger compartment through the vent openings 34, although only one is visible in FIG. 1.

The headliner duct 24 is formed by expanding a foam in a mold to provide a thin and lightweight body. It is appreciated, of course, that the headliner duct 24 is formable of other materials, including resins or plastics and can include glass or carbon fibers for added support. In addition, the headliner duct 24 formable by a variety of different methods, illustratively including vacuum molding, blow molding or injection molding.

Figure 2:
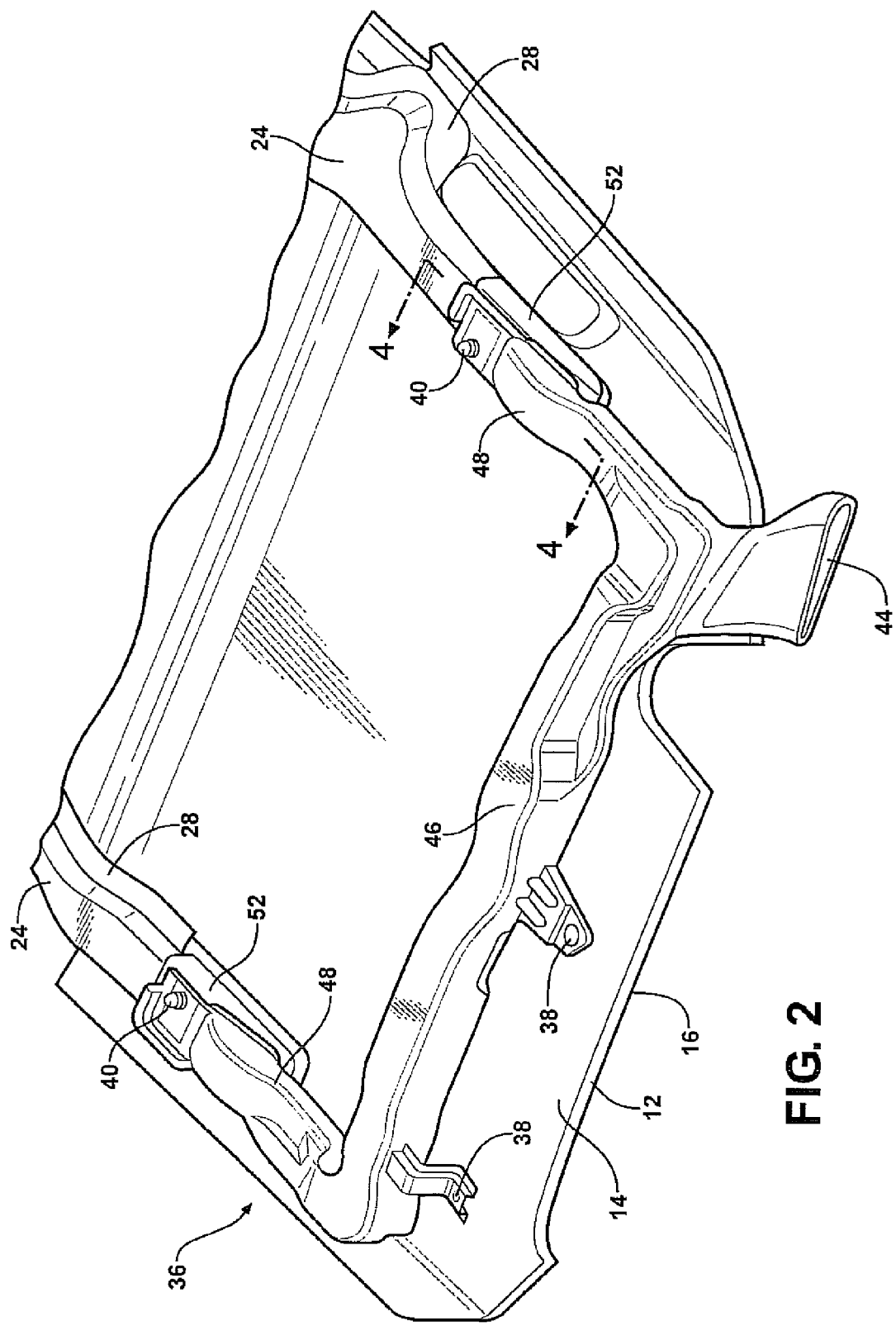
FIG. 2 is a partial enlarged view of the inventive air duct system.

Referring to FIGS. 1 and 2, a generally U-shaped roof duct 36 is provided to connect the headliner ducts 24. The roof duct 36 is attached to the roof 20 at a number of strategically located attachment points 38 prior to the installation of the headliner assembly 10. As best seen in FIG. 4, the roof duct 36 is secured to the roof 20 at the attachment points 38 by fasteners 40 which snap fit or frictionally engage apertures 42 formed in the roof 20.

It is appreciated, of course, that the roof duct 36 is secured to roof 20 at attachments points 38 by a number of known techniques illustratively including adhesives, welding, or any combination thereof.

The roof duct 36 includes an inlet 44 which engages with an air supply to receive directed air from an HVAC system, typically located in the engine compartment of the automotive vehicle. The HVAC system selectively cools and heats air, and directs the air through the air supply to engage with the inlet 44. In the illustrated embodiment, the inlet 44 is positioned adjacent a D pillar of the automotive vehicle. It is appreciated, of course, that the position of the inlet 44 corresponds to the location of the air supply. In an alternative embodiment, the air supply is positioned along the sides of the automotive vehicle and includes an air supply opening formed in the headliner body 12 engagable with either the inlet 44 of the roof duct 36 or the headliner duct 24. It is appreciated, of course, that the invention includes other embodiments wherein the headliner duct 24 is attached to the air supply and the roof duct 36 communicates with vent openings 34.

The roof duct 36 includes a main body 46 extending along the width of the headliner body 12. Arms 48 extend from either side of the main body 46, and include a portal 50 disposed on the distal ends of both the arms 48. The roof duct 36 defines an air flow passage extending from the inlet 44 to the portals 50 on each of the arms 48. In a preferred embodiment, the roof duct 36 is formed through a blow molded process which allows the air ducts to have a generally hollow, tubular shape. It will be appreciated, of course, that the roof duct 36 is formable through a variety of different methods.

As best seen in FIGS. 3 and 4, a connection member 52 disposed on both lateral sides 26 of the nonexposed surface 14 of the headliner body 12. The connection member 52 includes a first, open end 54 and a second end 56 having an aperture 58. The first end 54 engages with the portal 30 of the headliner ducts 24. Specifically, a portion of the headliner duct 24 adjacent the portal 30 overlaps the first end 54 of the connection member 52 to form an air flow passage. The second end 56 engages in abutting contact with the portal 50 of the roof duct 36 to form an air flow passage between the headliner duct 24 and the roof duct 36 when the headliner 10 is installed to the roof 20.

The connection member 52 is typically formed of a molded plastic material, although other materials or methods of producing are acceptable. The connection member 52 provides a rigid contact between the roof duct 36 and the headliner duct 24 as contact between the blow molded roof duct 36 and the thin headliner duct 24 could result in damage to the headliner duct 24.

A gasket 60 extends around the outer perimeter of each of the portals 50 on the arms 48; however, the gasket 60, optionally, extends around the outer perimeter of the aperture 58 formed in the second end 56 of the connection member 52. The gasket 60 is formed of a compressible material; preferably, the gasket 60 is formed of a compressible foam material having a thickness of 10 millimeters. The gasket 60 is compressed between the outer perimeter of the portal 50 and the second end 56 of the connection member 52 upon installation of the headliner assembly 10 to the roof 20. The gasket 60 acts as a seal between the roof duct 36 and the connection member 52 to stop air leakage. Further, the thickness of the gasket 60 allows for variations in the size and position of the roof duct 36 and the connection member 52 without affecting performance.

The connection between the roof duct 36 and the connection member 52 connects the roof duct 36 with the headliner duct 24, thereby providing an air flow passage. The HVAC system heats/cools air as selected by an occupant and directs the air to the air supply passage. The directed air enters the air duct system through the inlet 44 of the roof duct 36 and travels through the air flow passage created by the roof duct 36, the connection member 52, and the headliner duct 24. The directed air exits the air duct system through the vent openings 34 via the outlet 32, to enter the pass the passenger compartment of the automotive vehicle.

An attachment 62 is optionally disposed on the top surface 64 of the connection member 52. The attachment 62 secures the connection member 52 to the roof duct 36 so that the connection between the portal 50 and the aperture 58 is maintained during operation of the automotive vehicle. In addition, the attachment 62 provides the assembly team member with an audio notification that the roof duct 36 has engaged with the connection member 52. The attachment 62 is preferably a dual lock hook and loop type attachment, although, any known means of attaching one object to another may be used illustratively including snap taps, fasteners, or clips.

During assembly of the automotive vehicle the roof duct 36 is attached to the roof 20 by fasteners 40 at the various attachment points 38. Next, the headliner assembly 10 having the elongated headliner ducts 24 and the connection member 52 previously attached to the nonexposed surface 14 of the headliner body 12 is attached to the roof 20. An assembly team member aligns the headliner assembly 10 with the roof 20 and raises the headliner assembly 10 vertically into the installed position. The connection member 52 registers with the roof duct 36 through the abutting contact between the portal 50, the gasket 60, and the second end 56. As the air duct system is disposed between the nonexposed surface 14 of the headliner body 12 and the inner surface 18 of the roof 20, an assembly team member is unable to visually align the roof duct 50 with the connection member 52. However, as the gasket 60 allows for variation is position of either the roof duct 36 or the connection member 54, the assembly team member can connect the roof duct 36 with the headliner duct 24, via the connection member 52, without any visually alignment of the air duct system.

From the foregoing, it can be seen that the present invention provides an air duct assembly which combines an air duct attached to the roof of the automotive vehicle with an air duct attached to the headliner assembly to complete an air flow channel extending from an inlet to the vent opening. Having described the invention, however, many modifications thereto will become apparent to those skilled in the art to which it pertains without deviation from the spirit of the invention as defined by the scope of the appended claims.

It is claimed:

1. An air duct system for use in an automotive vehicle having an air supply for delivering directed air, said air duct system being disposed between an inner surface of a roof of the automotive vehicle and a nonexposed surface of a headliner, the headliner includes a vent opening for delivering directed air to a passenger compartment, said air duct system comprising:
   a first air duct attached to the inner surface of the roof, said first air duct having a first portal; and
   a second air duct attached to the nonexposed surface of the headliner, said second air duct having a second portal;
   wherein upon installation of the headliner to the roof said first portal registers with said second portal so as to provide an air flow passage between said first air duct and said second air duct.

2. The air duct system of claim 1, wherein said second air duct is formed of an elongated member having a generally U-shaped cross section and the nonexposed surface of the headliner.

3. The air duct system of claim 1, wherein said first air duct is formed of a generally hollow, tubular member.

4. The air duct system of claim 1, wherein said first air duct includes one of an inlet connected to the air supply or an outlet connected the vent opening, and wherein said second air duct includes the other of said inlet or said outlet so as to provide an air flow passage between the air supply and the vent opening.

5. The air duct system of claim 1, wherein said air duct system further includes a connection member having a first end and a second end, said first end being affixed to one of said first portal or said second portal, and wherein said second end is in abutting contact with the other of said first portal or said second portal upon installation of the headliner to the roof.

6. The air duct system of claim 5, wherein said connection member is attached to the nonexposed surface of the headliner.

7. The air duct system of claim 5, wherein a gasket is disposed between said second end of said connection member and the other of said first portal or said second portal to provide a seal.

8. The air duct system of claim 5, wherein said second end of said connection member is slanted so as to allow a free flow of the directed air between said first air duct and said second air duct.

9. A headliner assembly for covering an inner surface of a roof of an automotive vehicle having an air supply for delivering directed air, said headliner assembly comprising:
   a headliner body having a nonexposed surface facing the inner surface of the roof and a vent opening;
   a first air duct attached to the inner surface of the roof, said first air duct having a first portal; and
   a second air duct attached to said nonexposed surface of said headliner body, said second air duct having a second portal;
   wherein upon installation of said headliner body to the roof said first portal registers with said second portal so as to provide an air flow passage between said first air duct and said second air duct.

10. The air duct system of claim 9, wherein said second air duct is formed of an elongated member having a generally U-shaped cross section and said nonexposed surface of said headliner body.

11. The air duct system of claim 9, wherein said first air duct is formed of a generally hollow, tubular member.

12. The air duct system of claim 9, wherein said first air duct includes one of an inlet connected to the air supply or an outlet connected to said vent opening, and wherein said second air duct includes the other of said inlet or said outlet so as to provide an air flow passage between the air supply and said vent opening.

13. The air duct system of claim 9, wherein said headliner assembly further includes a connection member having a first end and a second end, said first end being affixed to one of said first portal or said second portal, and wherein said second end is in abutting contact with the other of said first portal or said second portal upon installation of said headliner body to the roof.

14. The air duct system of claim 13, wherein said connection member is attached to said nonexposed surface of said headliner body.

15. The air duct system of claim 13, wherein a gasket is disposed between said second end of said connection member and the other of said first portal or said second portal to provide a seal.

16. The air duct system of claim 13, wherein said second end of said connection member is slanted so as to allow a free flow of the directed air to flow between said first air duct and said second air duct.

* * * * *